United States Patent [19]
Kim et al.

[11] Patent Number: 6,009,074
[45] Date of Patent: Dec. 28, 1999

[54] CDMA MODULATION AND DEMODULATION METHOD REDUCING INTERFERENCE AND A COMMUNICATION SYSTEM USING THE SAME

[75] Inventors: Je Woo Kim, Seongnam-shi; Jun Mo Koo; Jin Ick Lee, both of Seoul, all of Rep. of Korea

[73] Assignee: SK Telecom Co., Ltd., Rep. of Korea

[21] Appl. No.: 08/903,248

[22] Filed: Jul. 24, 1997

[30] Foreign Application Priority Data

Jul. 25, 1996 [KR] Rep. of Korea ............... 96-30502

[51] Int. Cl.⁶ .................................................. H04B 1/707
[52] U.S. Cl. ........................ 370/209; 370/320; 375/200
[58] Field of Search ........................... 370/320, 328, 370/335, 342, 441, 204, 206, 209, 203, 367, 354, 208, 503, 515; 375/200, 208, 279, 280, 308, 329, 206, 367

[56] References Cited

U.S. PATENT DOCUMENTS

| | | | |
|---|---|---|---|
| 5,341,397 | 8/1994 | Gudmundson | 375/1 |
| 5,416,797 | 5/1995 | Gilhousen et al. | 375/705 |
| 5,528,624 | 6/1996 | Kaku et al. | 375/206 |
| 5,671,221 | 9/1997 | Yang | 370/320 |
| 5,708,658 | 1/1998 | Sugita | 370/335 |
| 5,712,869 | 1/1998 | Lee et al. | 375/206 |
| 5,715,236 | 2/1998 | Gilhousen et al. | 370/209 |
| 5,751,761 | 5/1998 | Gilhousen | 375/200 |
| 5,841,806 | 11/1998 | Gilhousen et al. | 375/206 |
| 5,844,936 | 12/1998 | Lesthievent | 375/206 |

*Primary Examiner*—Ajit Patel
*Assistant Examiner*—Brian Nguyen
*Attorney, Agent, or Firm*—Sheridan Ross P.C.

[57] ABSTRACT

A CDMA (Code Division Multiple Access) modulation and demodulation method and a communication system using the same which simultaneously transmits a pilot signal and a data signal through the same channel, thereby being capable of not only greatly the complexity of its transceiver, but also achieving an improvement in performance where a large number of multipaths are used. The method includes the steps of (a) generating a pilot signal and a transmission data signal; (b) spreading the pilot signal and the transmission data signal, by multiplying the pilot signal by an inphase pseudo noise sequence and by multiplying the transmission data by a quadrature pseudo noise sequence, respectively; (c) generating an inphase signal and a quadrature signal, by multiplying the spread pilot signal by an inphase walsh data sequence and by multiplying the spread transmission data by a quadrature walsh data sequence, respectively; (d) modulating the inphase signal and the quadrature signal, by multiplying the inphase signal and the quadrature signal by carrier signals; and (e) transmitting a composite signal created by adding the modulated inphase signal to the modulated quadrature signal.

14 Claims, 9 Drawing Sheets

CDMA MODULATION AND DEMODULATION METHOD REDUCING INTERFERENCE AND A COMMUNICATION SYSTEM USING THE SAME

BACKGROUND OF THE INVENTION

1. Field of the Invention

The present invention relates to a CDMA (Code Division Multiple Access) modulation and demodulating method and a communication system using the same, and more particularly relates to a CDMA modulation and demodulation method and a communication system using the same which simultaneously transmits a pilot signal and a data signal through the same channel.

2. Description of the Prior Art

FIG. 1 shows a block diagram of a CDMA QPSK modulator in accordance with a conventional techniques.

Multipliers 101A and 101B multiply the inphase data signal $d_I(t)$ and the quadrature data signal $d_Q(t)$ by the walsh code Wd(t). Then, adders 102A and 102B add each signal from multipliers 101A and 101B to the pilot signal Wp(t). Multipliers 103A and 104A multiply the inphase data signal from the adder 102A by the inphase pseudo noise sequence and carrier signal $\cos(\omega ct+\phi)$, which generates an inphase signal. Multipliers 103B and 104B multiply the quadrature data signal from the adder by the quadrature pseudo noise sequence and the carrier signal $\sin(\omega ct+\phi)$, which generates a quadrature signal. The carrier signal multiplied by the quadrature signal has a 90° phase difference from the carrier signal multiplied by the inphase signal. The adder 105 adds the inphase signal to the quadrature signal and generates transmission signal. Here, the QPSK modulation and demodulation method is used as a signal modulation and demodulation method.

FIG. 2 shows a block diagram of a CDMA QPSK demodulator in accordance with a conventional technique.

The demodulator consists of a pilot signal detecting part and a data signal recovering part.

The transmitted signal is received by the antenna (not shown in FIG. 2). The multiplier 201A multiplies the received signal from the antenna by cos ($\omega ct+\phi$) and then undergoes low pass filtering by the LPF (Low Pass Filter) 202A, which generates a baseband inphase signal. Also, the multiplier 201B multiplies the received signal by $\sin(\omega ct+\phi)$ and then undergoes low pass filtering by LPF (Low Pass Filter) 202B, which generates baseband quadrature signal.

Multipliers 203A and 203C multiply the inphase signal I(t) by the inphase and the quadrature pseudo noise sequence $P_I(t)$ and $P_Q(t)$, which generate despreading inphase signals. Multipliers 203B and 203D multiply the quadrature signal by the inphase and the negative quadrature pseudo noise sequence $P_I(t)$ and $P_Q(t)$, which generates despreading quadrature signals. The adder 204A adds the despread inphase signals. The adder 204B adds the despread quadrature signals. The multipliers 205A and 205B multiplies result values from the adders 204A and 204B by the pilot walsh sequence Wp(t). Then, the integration circuits 206A and 206B integrate the resulting values from the multipliers 205A and 205B, which generates phase difference compensation signals. The squaring circuits 207A and 207B squares the resulting value from the integration circuits 206A and 206B. Pilot signal is recovered by combining the resulting values from the squaring circuits 207A and 207B.

Multipliers 211A and 211B multiply the baseband inphase signal and the baseband quadrature signal by the walsh data sequence Wd(t). Multipliers 212A and 212C multiply the resulting value from the multiplier 211A by the inphase pseudo noise sequence $P_I(t)$ and the negative quadrature pseudo noise sequence $-P_Q(t)$. Multipliers 212B and 212D multiply result value from the multiplier 211B by the inphase pseudo noise sequence $P_I(t)$ and the quadrature pseudo noise sequence $P_Q(t)$. Integration circuits 213A through 213D integrate the resulting values from the multipliers 212A through 212D. Multipliers 214A and 214D each multiply the resulting values from the integration circuits 213A and 213D by Acosφ. Multipliers 214B and 214C each multiply the resulting values from the integration circuits 213B and 213C by Asinφ. An adder 215A adds the resulting value from the multiplier 214A to the resulting value from the multiplier 214B. which recovers the inphase data signal. An adder 215B adds result from the multiplier 214C to result from the multiplier 214D, which recovers the quadrature data signal.

A general DS/CDMA communication system needs a pilot signal for the establishment and tracking of synchronization. Using the pilot signal, it is easy to implement receiver because of easy extraction of the phase difference compensation signal. However, it needs electric power and radio channel for transmitting the pilot signal, which reduces a accommodation capacity of the communication system.

To overcome these problems, in the conventional system, the pilot signal is used only in the forward channel transmission from the base station to the mobile station, and not in the backward channel transmission from the mobile station to the base station. This does not cause a reduction in the accommodation capacity. However, there is a problem in performance and a difficult implementation of the receiver.

SUMMARY OF THE INVENTION

Therefore, an object of the present invention is to provide a modulation and demodulation method and a communication system using the same, which transmits both data signal and pilot signal on a radio channel, thereby improving performance and complexity of the receiver without a high power consumption and a capacity reduction.

According to the first aspect of the present invention, this object is accomplished by providing a CDMA (Code Division Multiple Access) modulation method for modulating a transmission signal in a CDMA communication system, including the steps of:

(a) generating a pilot signal and a transmission data signal; (b) spreading the pilot signal and the transmission data signal, by multiplying the pilot signal by an inphase pseudo noise sequence and by multiplying the transmission data by a quadrature pseudo noise sequence, respectively; (c) generating an inphase signal and a quadrature signal, by multiplying the spread pilot signal by an inphase walsh data sequence and by multiplying the spread transmission data by a quadrature walsh data sequence, respectively; (d) modulating the inphase signal and the quadrature signal, by multiplying the inphase signal and the quadrature signal by carrier signals; and (e) transmitting a composite signal created by adding the modulated inphase signal to the modulated quadrature signal.

According to the second aspect of the present invention, this object is accomplished by providing a CDMA (Code Division Multiple Access) demodulation method for demodulating a transmitted signal in a CDMA communication system, including the steps of:

(a) receiving a signal compounded by an inphase signal and a quadrature signal; (b) demodulating the transmitted signal; (c) establishing and tracking synchronization of the demodulated transmitted signal; (d) recovering a pilot signal and a phase difference compensation signal using the demodulated transmitted signal and the signal performed of synchronization establishment and tracking; and (e) recovering the transmission data using the demodulated transmitted signal, the signal established and tracked of synchronization, the recovered pilot signal and the recovered phase difference compensation signal.

According to the third aspect of the present invention, this object is accomplished by providing a CDMA (Code Division Multiple Access) modulation and demodulation method for modulating and demodulating a transmission signal in a CDMA communication system, including the steps of:

(a) generating a pilot signal and a transmission data signal; (b) spreading the pilot signal and the transmission data signal, by multiplying the pilot signal by an inphase pseudo noise sequence and by multiplying the transmission data by a quadrature pseudo noise sequence, respectively; (c) generating an inphase signal and a quadrature signal, by multiplying the spread pilot signal by an inphase walsh data sequence and by multiplying the spread transmission data by a quadrature walsh data sequence, respectively; (d) modulating the inphase signal and the quadrature signal, by multiplying the inphase signal and the quadrature signal by carrier signals; (e) transmitting a composite signal created by adding the modulated inphase signal to the modulated quadrature signal; (f) receiving a small compounded by an inphase signal and a quadrature signal; (g) demodulating the transmitted signal; (h) establishing and tracking synchronization of the demodulated transmitted signal; (i) recovering a pilot signal and a phase difference compensation signal using the demodulated transmitted signal and the signal performed of synchronization establishment and tracking; and (j) recovering the transmission data using the demodulated transmitted signal, the signal established and tracked of synchronization, the recovered pilot signal and the recovered phase difference compensation signal.

According to the fourth aspect of the present invention, this object is accomplished by providing a CDMA (Code Division Multiple Access) transmitter comprising:

a generator for generating a pilot signal and a data signal; a first multiplier for spreading the pilot signal by multiplying the pilot signal by an inphase pseudo noise sequence; a second multiplier for spreading a data signal by multiplying the data signal by a quadrature pseudo noise sequence, a third multiplier for multiplying an input signal from the first multiplier by an inphase walsh data sequence, which generates an inphase signal; a fourth multiplier for multiplying an input signal from the second multiplier by a quadrature walsh data sequence, which generates quadrature signal; a modulator for modulating the inphase signal and the quadrature signal; and a transmitting part for transmitting transmission data, after generating the transmission data signal by adding the modulated inphase signal to the modulated quadrature signal.

According to the fifth aspect of the present invention, this object is accomplished by providing a CDMA (Code Division Multiple Access) receiver comprising:

a receiving part for receiving a transmitted signal; demodulator for demodulating the transmitted signal; a low pass filter for converting the transmitted signal to a baseband inphase signal and a baseband quadrature signal; a synchronization establishing and tracking part for of the baseband inphase signal and the baseband quadrature signal, a pilot signal and phase difference compensation signal detecting part for detecting a pilot signal and a phase difference compensation signal using the baseband inphase signal and the baseband quadrature signal; and a data signal detecting part for recovering a data signal using the baseband inphase signal, the baseband quadrature signal, the pilot signal and the phase difference compensation signal.

According to the sixth aspect of the present invention, this object is accomplished by providing a CDMA (Code Division Multiple Access) communication system comprising:

a transmitter comprising:

a generator for generating a pilot signal and a data signal; a first multiplier for spreading the pilot signal by multiplying the pilot signal by an inphase pseudo noise sequence; a second multiplier for spreading a data signal by multiplying the data signal by a quadrature pseudo noise sequence; a third multiplier for multiplying an input signal from the first multiplier by an inphase walsh data sequence, which generates an inphase signal, a fourth multiplier for multiplying an input signal from the second multiplier by a quadrature walsh data sequence, which generates quadrature signal; a modulator for modulating the inphase signal and the quadrature signal; and a transmitting part for transmitting transmission data, after generating the transmission data signal by adding the modulated inphase signal to the modulated quadrature signal, and a receiver comprising:

receiving part for receiving a transmitted signal demodulator for demodulating the transmitted signal; a low pass filter for converting the transmitted signal to a baseband inphase signal and a baseband quadrature signal, a synchronization establishing and tracking part for establishing and tracking synchronization of the baseband inphase signal, and the baseband quadrature signal, a pilot signal and phase difference compensation signal detecting part for detecting a pilot signal and a phase difference compensation signal using the baseband inphase signal and the baseband quadrature signal; and a data signal detecting part for recovering a data signal using the baseband inphase signal, the baseband quadrature signal, the pilot signal and the phase difference compensation signal.

BRIEF DESCRIPTION OF THE DRAWINGS

Other objects and aspects of the invention will become more apparent from the following description of the embodiments with reference to the accompanying drawings in which.

DETAILED DESCRIPTION OF THE PREFERRED EMBODIMENTS

The embodiments of the present invention will be described with reference to the accompanying FIGS. 3 through 9.

Figure 1:
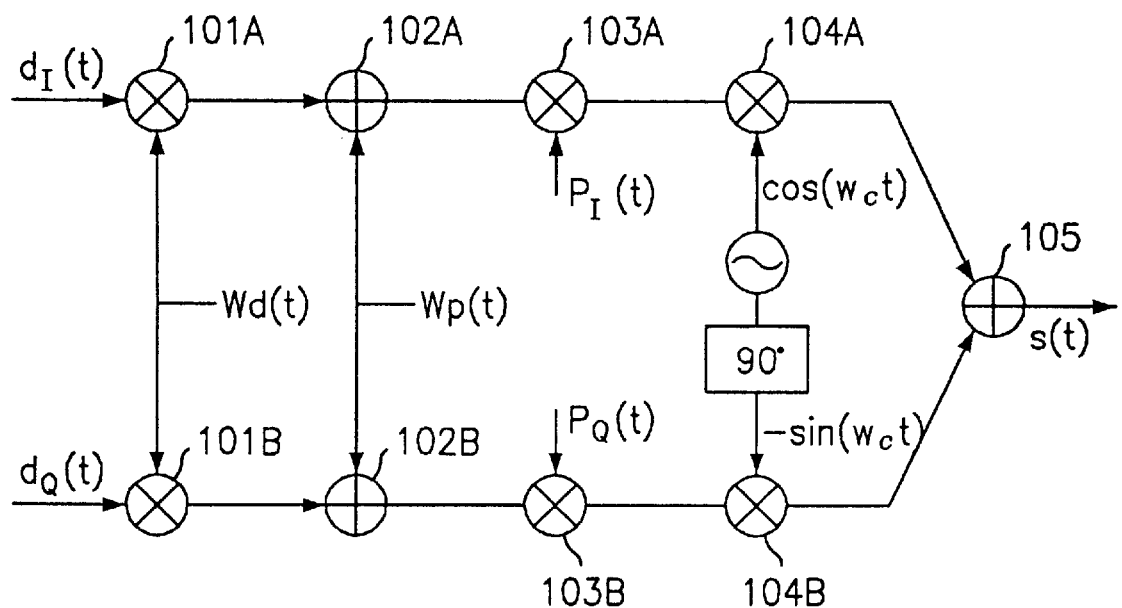
FIG. 1 is a block diagram of a CDMA QPSK modulator in accordance with a conventional technique.
Figure 2:
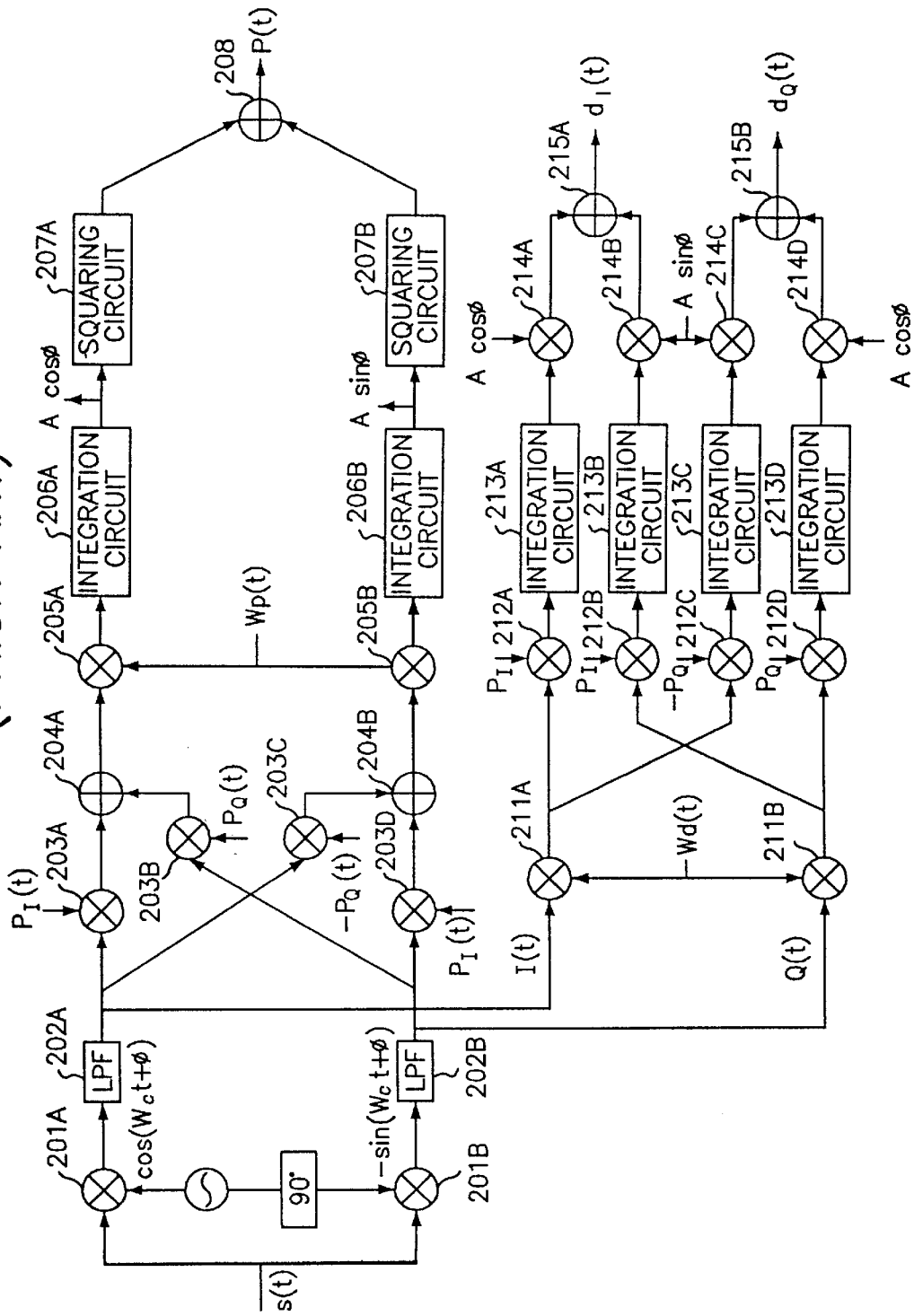
FIG. 2 is a block diagram of a CDMA QPSK demodulator in accordance with a conventional technique.
Figure 3:
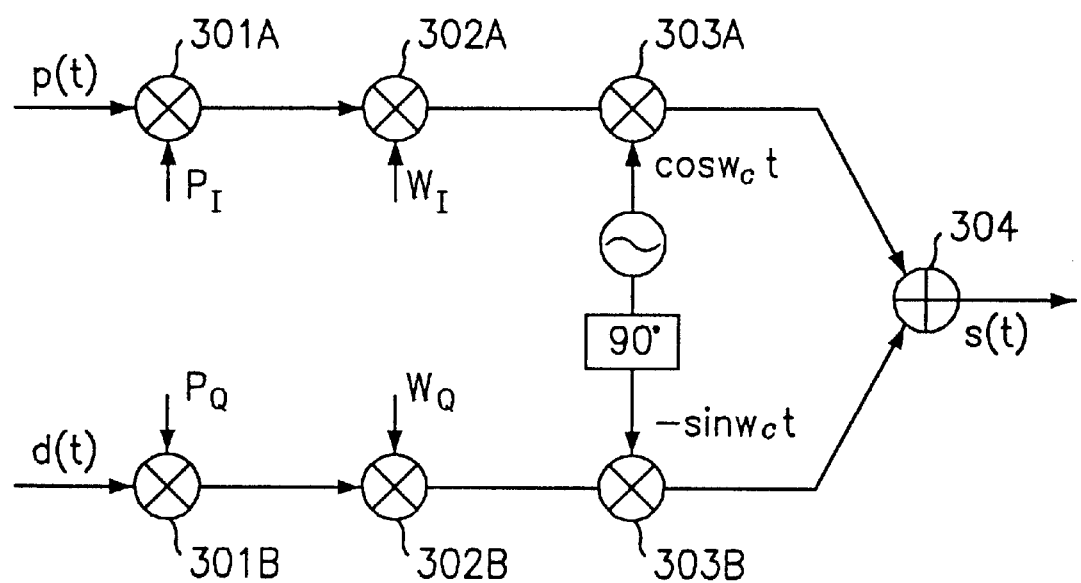
FIG. 3 is a block diagram of a CDMA QPSK modulator in accordance with the present invention.

FIG. 3 shows a block diagram of a CDMA QPSK modulator in accordance with the present invention.

A pilot signal is multiplied by the inphase pseudo noise sequence $P_1$, the inphase walsh data sequence $W_I$ and the carrier signal $\cos(\omega_c t)$ by using multipliers 301A, 302A and 303A, which becomes the spread modulated pilot signal. A data signal is multiplied by a quadrature pseudo noise sequence $P_Q$, quadrature walsh data sequence $W_Q$ and a carrier signal $-\sin(\omega_c t)$ by using multiplies 301B, 302B and 303B, which becomes the spread modulated data signal. The adder 304 combines a spread modulated pilot signal with the spread modulated data signal and generates a transmission signal s(t). In the present embodiment, QPSK modulation method is used as a modulation method.

The input value of the pilot channel is a constant binary data value 1, and the input value of the data channel is any binary data value 0 or 1.

The above described modulation process can be expressed by the following equation.

$$s(t)=P_I(t)W_I(t)\cos(w_c t+\phi)-d(t)P_Q(t)W_Q(t)\sin(w_c t+\phi)$$

Where, s(t) designated a transmission signal, $P_I(t)$ an inphase pseudo noise sequence, $P_Q(t)$ a quadrature pseudo noise sequence, $W_I(t)$ an inphase walsh data sequence, and $W_Q(t)$ a quadrature inphase walsh data sequence.

Pseudo sequences $P_I$ and $P_Q$ have a constant period and a similar frequency distribution to white noise in the constant period. They are generated by a general pseudo noise generator. The pseudo sequences $P_I$ and $P_Q$ must have minimum cross-correlation values.

Walsh data sequences $W_I$ and $W_Q$ are selected in a plurality of walsh data sequences. The walsh data I1 having a length of 2 is described as $$I1 = \begin{Bmatrix} 1 & 1 \\ 0 & 1 \end{Bmatrix}.$$

The walsh data I1 having a length of 2 can be obtained from the matrix as follows:

$$In = \begin{Bmatrix} In-1 & In-1 \\ In-1 & \overline{In-1} \end{Bmatrix}$$

Here, $\overline{I_{n-1}}$ has a reverse value of $I_{n-1}$.

Figure 4:
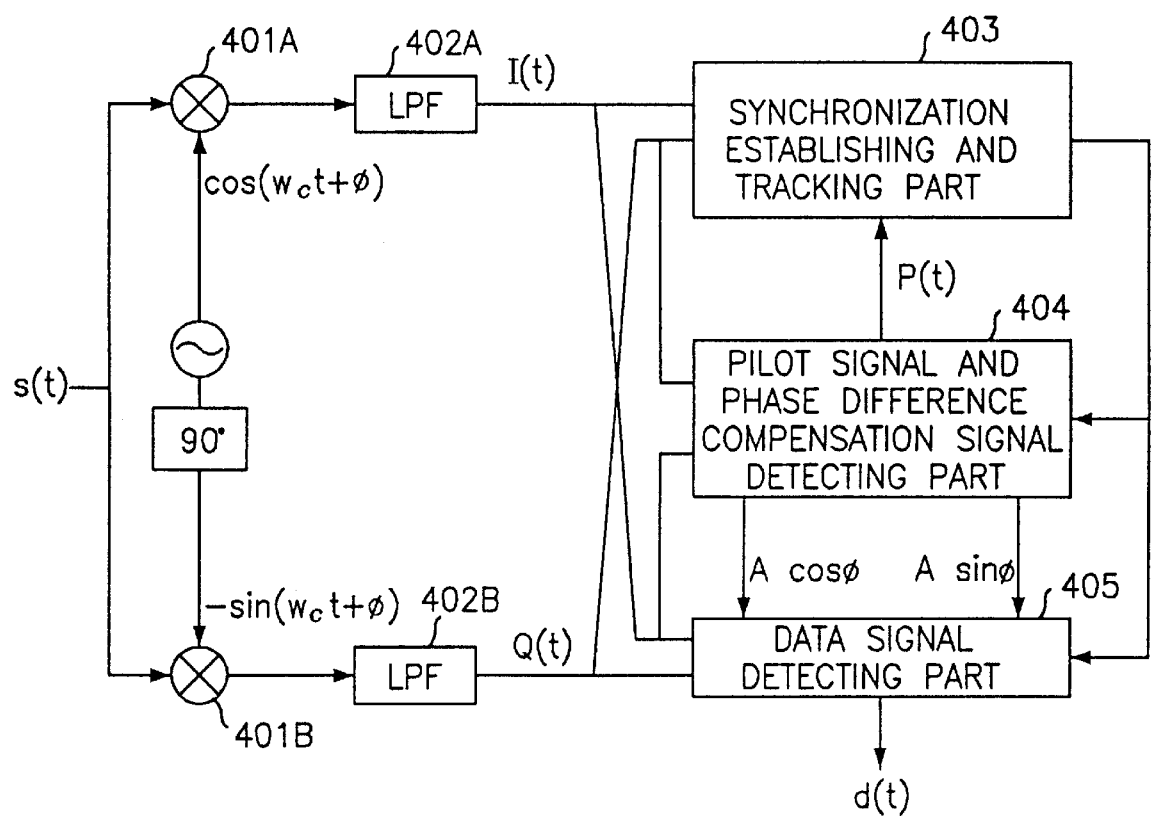
FIG. 4 is a block diagram of a CDMA QPSK demodulator in accordance with the present invention.

FIG. 4 shows a block diagram of CDMA QPSK demodulator in accordance with the present invention. The CDMA QPSK demodulator shown in FIG. 4 demodulates the transmission signal s(t) modulated by the modulator as shown in FIG. 3.

The pilot signal is demodulated by an asynchronous method. Multipliers 401A and 401B multiply the modulated input signal s(t) by carriers $\cos(\omega_c t+\phi)$ and $-\sin(\omega_c t+\phi)$. The LPF (Low Pass Filter) 402A and 402B convert the signal from the multipliers to the baseband inphase signal I(t) and the baseband quadrature signal Q(t). In other words, the transmitted signal undergoes baseband filtering after being multiplied by carrier and becomes the inphase signal I(t) and the quadrature signal Q(t) as follows:

$$I(t)=[P_I(t)W_I(t)\cos(\phi)-d(t)P_Q(t)W_Q(t)\sin(\phi)]$$

$$Q(t)=[P_I(t)W_I(t)\sin(\phi)+d(t)P_Q(t)W_Q(t)\cos(\phi)]$$

The pilot signal and the phase difference compensation signal detecting part 404 detects pilot signal p(t) and the phase difference compensation signal $A\cos\phi$ and $A\sin\phi$ by using the inphase signal I(t) and the quadrature signal Q(t) fed from the LPF 402A. The synchronization establishing and tracking part 403 establishes and tracks synchronization of the spreading code using the inphase signal I(t), the quadrature signal Q(t) and the pilot signal p(t). The data signal detecting part 405 recovers the data signal by using the inphase signal I(t), the quadrature signal Q(t) and the phase difference compensation signal.

Figure 5:
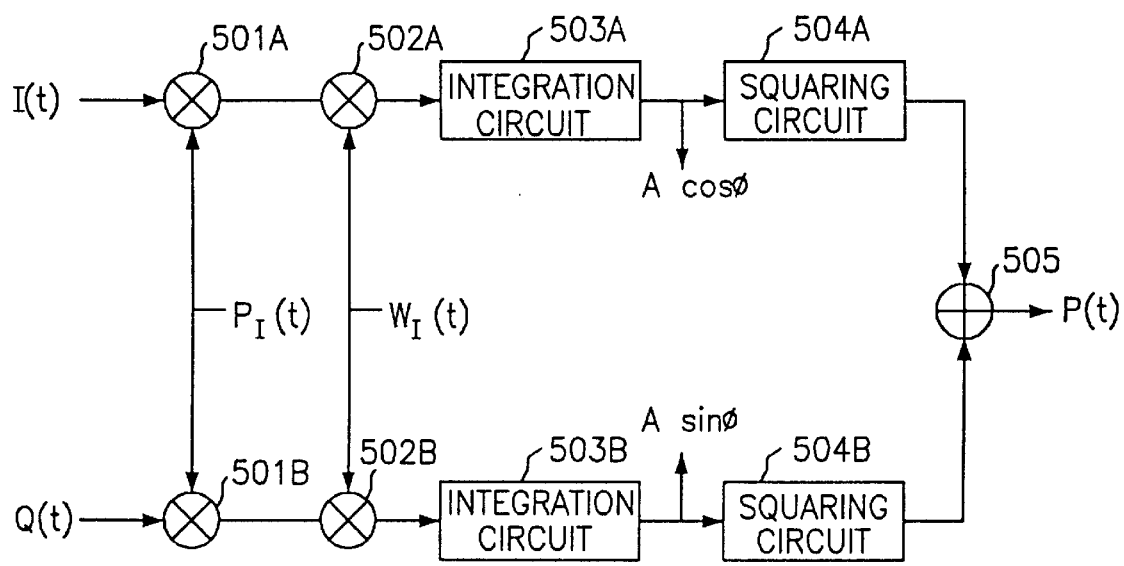
FIG. 5 is a detail diagram of the pilot signal detecting part and the phase compensation signal detecting part of FIG. 4.

FIG. 5 shows a detail diagram of the pilot signal detecting part and the phase compensation signal detecting part of FIG. 4.

Multipliers 501A and 502A multiply the inphase signal I(t) by both the pseudo noise sequence $P_I(t)$ and walsh data sequence $W_I(t)$. Multipliers 501B and 502B multiply the quadrature signal Q(t) by both the pseudo noise sequence $P_I(t)$ and walsh data sequence $W_I(t)$. The integration circuits 503A and 503B integrate the resulting value from the multipliers 502A and 502B and detect the phase difference compensation signal $A\cos\phi$ and $A\sin\phi$. The phase difference compensation signal $A\cos\phi$ and $A\sin\phi$ is used for compensating the phase difference in the data signal detecting part 405. Each output signal from the integration circuits 503A and 503B are combined after squared by square circuit 504A and 504B such that a pilot signal can be recovered.

Figure 6:
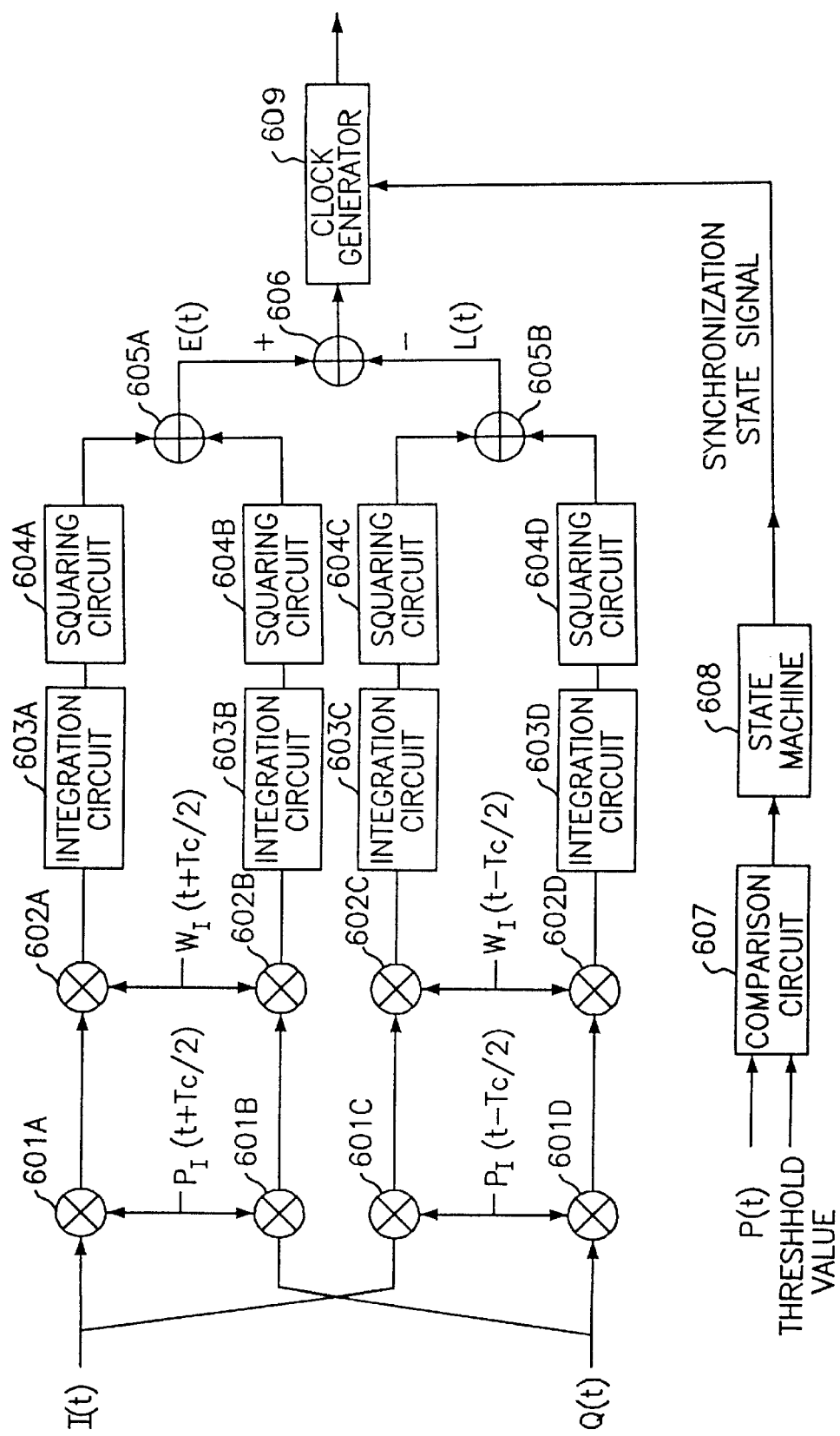
FIG. 6 is a detail diagram of the synchronization establishing and tracking part of FIG. 4.

FIG. 6 shows a detail diagram of the synchronization establishing and tracking part of FIG. 4.

The synchronization establishing and tracking part 403 coincides order of the pseudo noise sequence generated by the demodulator with that of the order of the pseudo noise sequence generated by the modulator.

The synchronization establishment is performed by comparing the value of the pilot signal with the threshold value, and by operating the state machine. The state machine shifts the comparing result between the pilot signal and the threshold value. If the establishment of synchronization is determined, the tracking circuit tracks the generation order of the pseudo noise sequence in the modulator.

Multipliers 601A and 601B multiply the inphase signal I(t) and the quadrature signal Q(t) by the pseudo noise sequence whose clock is ½ clock prior to the present pseudo noise sequence. Multipliers 602A and 602B multiply the inphase signal I(t) and the quadrature signal Q(t) by the walsh data sequence whose clock is ½ clock prior to the present walsh data sequence. Integration circuits 603A and 603B integrate the resulting values from the multipliers 602A and 602B. The squaring circuits 604A and 604B square result values from the integration circuits 603A and 603B. The adder 605A adds the resulting values from the squaring circuits 604A and 604B, which generates signal E(t).

Multipliers 601C and 601D multiply the inphase signal I(t) and the quadrature signal Q(t) by the pseudo noise sequence whose clock is ½ clock later than the present pseudo noise sequence. Multipliers 602C and 602D multiply the inphase signal I(t) and the quadrature signal Q(t) by the walsh data sequence whose clock is ½ clock later than the present walsh data sequence. Integration circuits 603A and 603D integrate the resulting values from the multipliers 602C and 602D. Squaring circuits 604C and 604D square the resulting values from the integration circuits 603C and 603D. Adder 605B adds the resulting values from the squaring circuits 604C and 604D, which generates signal L(t).

Tracking is performed by reducing or by expanding one clock of the clock generator using the difference between the signal E(t) and the signal L(t). In other words, if the amplitude of the signal E(t) is the same as that of the signal L(t), the same clock as the present clock is generated, if the amplitude of the signal E(t) is larger than that of the signal L(t), a faster clock than the present clock is generated, and if the amplitude of the signal E(t) is smaller than that of the signal L(t), a slower clock than the present clock is generated. The clock adjusted in this method is used as a clock of the pseudo noise sequence generator of the walsh data sequence generator in the demodulator.

Figure 7:
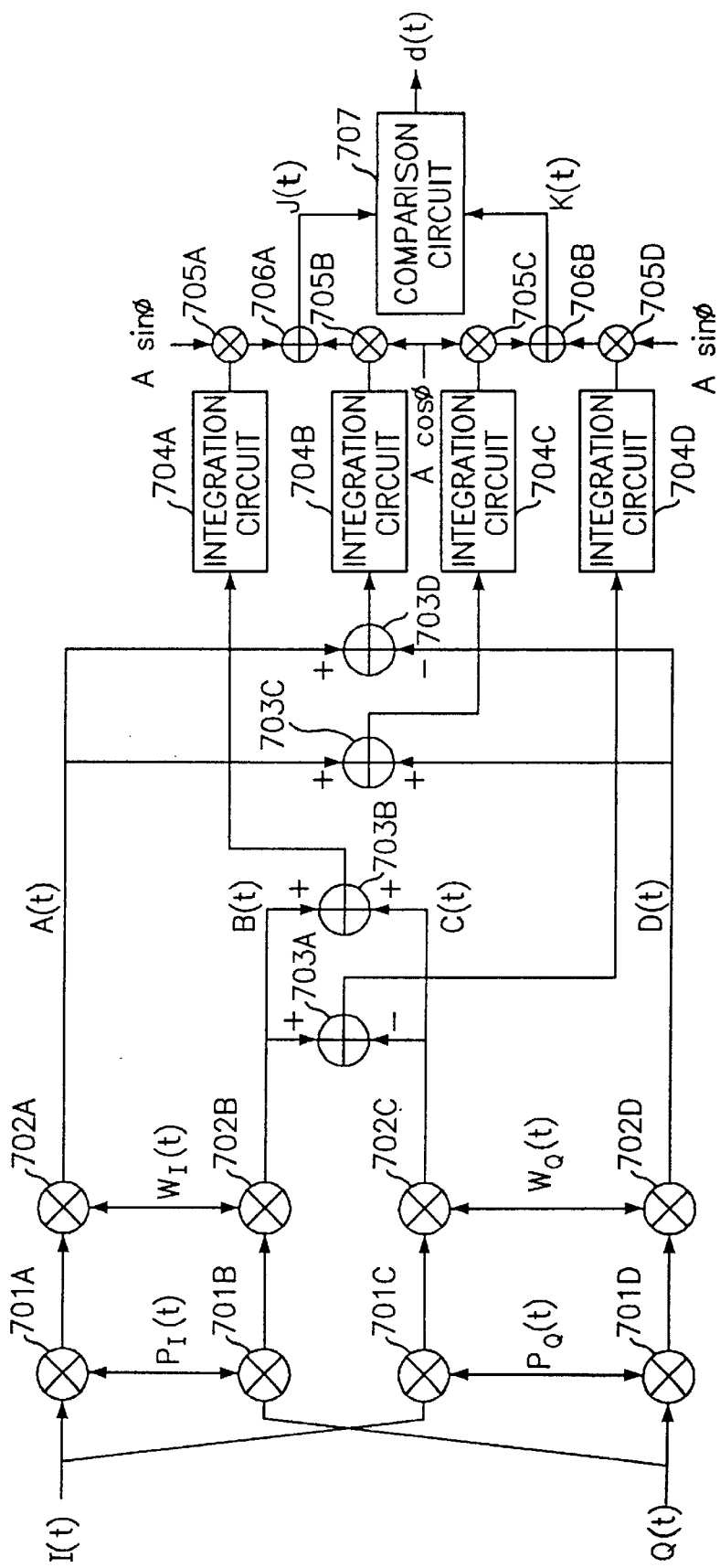
FIG. 7 is a detail diagram of the data signal demodulating part in accordance with the present invention.

FIG. 7 is a detail diagram of the data signal demodulating part in accordance with the present invention.

The inphase signal I(t) is multiplied by the inphase pseudo noise sequence $P_I(t)$ and the inphase walsh data $W_I(t)$, which generates signal A(t). The quadrature signal Q(t) is multiplied by the inphase pseudo noise sequence $P_I(t)$ and the inphase walsh data $W_I(t)$, which generates signal B(t). The inphase signal I(t) is multiplied by the quadrature pseudo noise sequence $P_Q(t)$ and the quadrature walsh data $W_Q(t)$, which generates signal C(t). The quadrature signal Q(t) is multiplied by the quadrature pseudo noise sequence $P_Q(t)$ and the quadrature walsh data $W_Q(t)$ which generates signal D(t). Adders 703A through 703D add the signals and generate signals A(t)30 D(t), A(t)−D(t), B(t)+C(t) and B(t)−C(t).

The integration circuit 704A integrates the signal B(t)+C(t) from the adder 703B. The integration circuit 704B integrates the signal A(t)−D(t) from the adder 703D. The integration circuit 704C integrates the signal A(t)+D(t) from the adder 705C. The integration circuit 704D integrates the signal B(t)−C(t) from the adders 703A. And the integration circuit 704B integrates the signal A(t)−D(t) from the adder 703D.

Multipliers 705A and 705D multiply the output signal from integration circuits 704A and 704D by Asinφ. Multipliers 705B and 705C multiply the output signal from integration circuits 704B and 704C by Acosφ.

An adder 706A adds the output signal from the multiplier 705A to the output signal from the multiplier 705B, which generates the signal J(t). An adder 706B adds the output signal from the multiplier 705C to the output signal from the multiplier 705D, which generates the signal K(t).

The comparator 707 compares the signal J(t), with the signal K(t) and outputs the compared result. In other words, if the signal J(t) is larger than the signal K(t), the transmitted data value is determined as 1. If the signal J(t) is less than the signal K(t), the transmitted data value is determined as 1.

In the present embodiment, the transmitted data is detected by assuming the transmitted data in advance, by calculating the assumed data in the above described method, and by comparing the calculated values.

Hence, the above described process can be expressed by the following equation.

$$\sum_T (A(t) - D(t))\cos\phi = \sum_T [I(t)P_I(t)W_I(t)\cos\phi - Q(t)P_Q(t)W_Q(t)\cos\phi]$$

$$= \sum_T [P_I^2(t)W_I^2(t)\cos^2\phi -$$

$$d(t)P_Q(t)W_Q(t)P_I(t)W_I(t)\cos\phi\sin\phi] -$$

$$[P_Q(t)W_Q(t)P_I(t)W_I(t)\cos\phi\sin\phi +$$

$$d(t) \cdot P_Q^2(t)W_Q^2(t)\cos^2\phi]$$

$$= 2T\cos^2\phi, \quad \text{for } d(t) = -1$$

$$= 0, \quad \text{for } d(t) = 1$$

$$\sum_T (C(t) + B(t))\sin\phi = \sum_T (I(t)P_Q(t)W_Q(t)\sin\phi + Q(t)P_I(t)W_I(t)\sin\phi)$$

$$= \sum_T [P_I W_I(t)P_Q(t)W_Q(t)\cos\varphi\sin\varphi -$$

$$d(t,\tau)P_Q^2(t)W_Q^2(t)\sin^2\varphi] - [P_I^2(t)W_I^2(t)\sin^2\varphi +$$

$$d(t,\tau)P_Q P_I(t)W_I(t)W_Q(t)\sin\varphi\cos\varphi]$$

$$= 2T\sin^2\varphi, \quad \text{for } d = -1$$

$$= 0, \quad \text{for } d = 1$$

$$J(t) = 2T(\sin^2\varphi + \cos^2\varphi) = 2T \quad \text{for } d = -1$$

$$= 0, \quad \text{for } d = 1$$

$$\sum_T (A(t) + D(t))\cos\phi = \sum_T (I(t)P_I(t)W_I(t)\cos\phi + Q(t)P_Q(t)W_Q(t)\cos\phi)$$

$$= \sum_T [P_I^2(t)W_I^2(t)\cos^2\phi -$$

$$d(t)P_Q(t)W_Q(t)P_I(t)W_I(t)\cos\phi\sin\phi] +$$

$$[P_Q(t)W_Q(t)P_I(t)W_I(t)\cos\phi\sin\phi +$$

$$d(t) \cdot P_Q^2(t)W_Q^2(t)\cos^2\phi]$$

$$= 2T\cos^2\phi, \quad \text{for } d(t) = 1$$

$$= 0, \quad \text{for } d(t) = -1$$

$$\sum_T (-C(t) + B(t))\sin\phi = \sum_T (-I(t)P_Q(t)W_Q(t)\sin\phi + Q(t)P_I(t)W_I(t)\sin\phi)$$

$$= \sum_T [-P_I(t)P_Q(t)W_I(t)W_Q(t)\cos\phi\sin\phi +$$

$$d(t,\tau)P_Q^2(t)W_Q^2(t)\sin\phi] +$$

$$[P_I^2(t)W_I^2(t)\sin^2\phi +$$

$$d(t,\tau)P_Q P_I(t)W_I(t)W_Q(t)\sin\phi\cos\phi]$$

$$= 2T\sin^2\phi, \quad \text{for } d = 1$$

$$= 0, \quad \text{for } d = -1$$

$$K(t) = 2T(\sin^2\phi + \cos^2\phi) = 2T \quad \text{for } d = 1$$

$$= 0, \quad \text{for } d = -1$$

Figure 8:
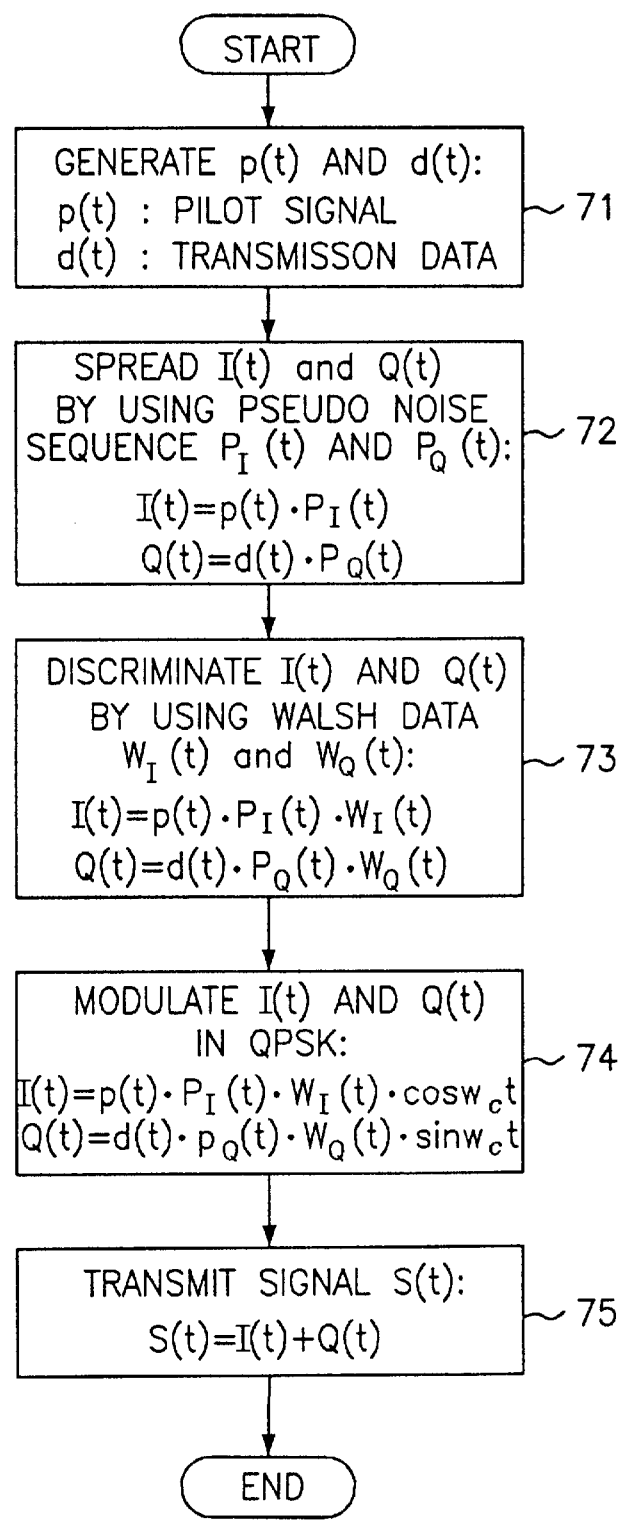
FIG. 8 is a flowchart illustrating a CDMA modulating method reducing interference in accordance with the present invention.

FIG. 8 shows a flowchart illustrating a CDMA modulating method reducing interference in accordance with the present invention.

The data generator generates the pilot signal p(t) and the transmission data d(t) at step 71. The multipliers 301A and 301B spread the pilot signal p(t) and the transmission data d(t) using the pseudo noise sequences at step 72. In other words, the multiplier 301A multiplies the pilot signal p(t) by the inphase pseudo noise sequence $P_I(t)$, and the multiplier 301B multiplies the transmission data d(t) by the quadrature pseudo noise sequence $P_Q(t)$. The multipliers 302A and 302B discriminate channels using the walsh data sequences at step 73. The multiplier 302A multiplies the spread signal from the multiplier 301A by the inphase walsh data sequence, and the multiplier 302B multiplies the spread signal from the multiplier 301B by the quadrature walsh data sequence. The multipliers 303A and 303B QPSK modulate the pilot signal p(t) and the transmission data d(t) at step 74. In other words, the multiplier 303A multiplies the signal from the multiplier 302A by the carrier cosϕct, and the multiplier 303B multiplies the signal from the multiplier 302B by carrier cosωct. The adder 304 adds the inphase signal I(t) from the multiplier 303A to the quadrature signal Q(t), generates the transmission signal s(t) and transmits the transmission signal s(t) through the antenna (not shown in FIG. 3) at step 75.

Figure 9:
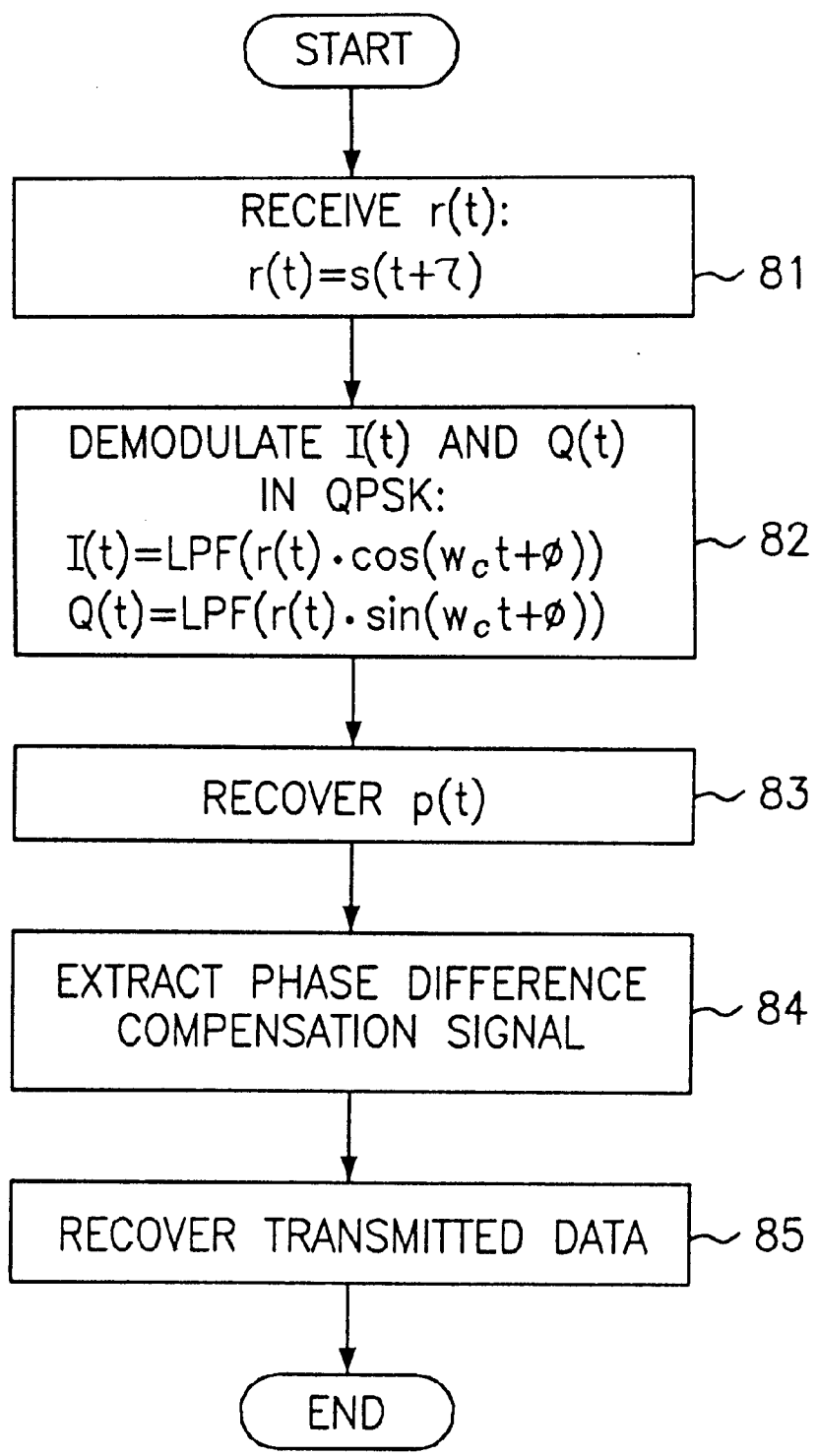
FIG. 9 is a flowchart illustrating a CDMA demodulating method reducing interference in accordance with the present invention.

FIG. 9 shows a flowchart illustrating a CDMA demodulating method reducing interference in accordance with the present invention.

The transmitted signal is received through the antenna (not shown in FIG. 4) at step 81, and then QPSK demodulated at step 82. In other words, the multipliers 401A and 401B multiply the received signal s(t) by $\cos(\omega ct+\phi)$ and $-\sin(\omega ct+\phi)$. The provided signals from the multipliers 401A and 401B undergo low pass filtering by the LPF 402A and 402B. The LPF 402A and 402B output the baseband inphase signal I(t) and the baseband quadrature signal Q(t). The inphase signal I(t) and the quadrature signal Q(t) undergo establishment of synchronization and tracking in the same method as described above with reference to FIG. 6 such that the pilot signal p(t) is recovered at step 83. At step 84, the phase difference compensation signals are extracted in the same method as described above with reference to FIG. 7. At step 85, the transmitted data is recovered in the same method as described above with reference to FIG. 7.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A CDMA (Code Division Multiple Access) modulation method for modulating a transmission signal in a CDMA communication system, including the steps of:
   (a) generating a pilot signal and a transmission data signal;
   (b) spreading the pilot signal and the transmission data signal, by multiplying said pilot signal by an inphase pseudo noise sequence and by multiplying said transmission data by a quadrature pseudo noise sequence, respectively;
   (c) generating an inphase signal and a quadrature signal, by multiplying said spread pilot signal by an inphase walsh data sequence and by multiplying said spread transmission data by a quadrature walsh data sequence, respectively;
   (d) modulating said inphase signal and said quadrature signal, by multiplying said inphase signal and said quadrature signal by carrier signals; and
   (e) transmitting a composite signal created by adding said modulated inphase signal to said modulated quadrature signal.

2. A CDMA modulation method as claimed in claim 1, wherein said carrier signal which is multiplied by said inphase signal has a 90° phase difference from said carrier which is multiplied by said quadrature signal.

3. A CDMA modulation method as claimed in claim 1, wherein the modulation method used in said step of (d) modulating is the QPSK (Quadrature Phase shift keying) modulation method.

4. A CDMA (Code Division Multiple Access) demodulation method for demodulating a transmitted signal in a CDMA communication system, including the steps of:
   (a) receiving a signal compounded by an inphase signal and a quadrature signal;
   (b) demodulating the transmitted signal;
   (c) establishing and tracking synchronization of said demodulated transmitted signal;
   (c-1) multiplying said inphase signal and said quadrature signal by a pseudo noise sequence and a walsh data sequence whose clocks are ½ clock prior to the reference pseudo noise sequence and the reference walsh data sequence;
   (c-2) squaring said multiplied inphase signal and said multiplied quadrature signal;
   (c-3) multiplying said inphase signal and said quadrature signal by a pseudo noise sequence and a walsh data sequence whose clocks are ½ clock later than the reference pseudo noise sequence and the reference walsh data sequence;
   (c-4) squaring said multiplied inphase signal and said multiplied quadrature signal; and
   (c-5) generating a clock in response to the resulting value of said squared signal;
   (d) recovering a pilot signal and a phase difference compensation signal using said demodulated transmitted signal and said signal performed of synchronization establishment and tracking; and
   (e) recovering said transmission data using said demodulated transmitted signal, said signal established and tracked of synchronization, said recovered pilot signal and said recovered phase difference compensation signal.

5. A CDMA (Code Division Multiple Access) demodulation method for demodulating a transmitted signal in a CDMA communication system, including the steps of:
   (a) receiving a signal compounded by an inphase signal and a quadrature signal;
   (b) demodulating the transmitted signal;
   (c) establishing and tracking synchronization of said demodulated transmitted signal;
   (d) recovering a pilot signal and a phase difference compensation signal using said demodulated transmitted signal and said signal performed of synchronization establishment and tracking;
   (e) recovering said transmission data using said demodulated transmitted signal, said signal established and tracked of synchronization, said recovered pilot signal and said recovered phase difference compensation signal;
   (e-1) multiplying said inphase signal by said inphase pseudo noise sequence and said inphase walsh data sequence;
   (e-2) multiplying said inphase signal by said quadrature pseudo noise sequence and said quadrature walsh data sequence;

(e-3) multiplying said quadrature signal by said inphase pseudo noise sequence and said inphase walsh data sequence;

(e-4) multiplying said quadrature signal by said quadrature pseudo noise sequence and said quadrature walsh data sequence;

(e-5) subtracting the resulting value of said step (e-4) from the resulting value of said step (e-1), integrating said subtracted signal and multiplying said integrated signal by said phase difference compensation signal;

(e-6) adding the resulting value of said step (e-1) to the resulting value of said step (e-4), integrating said subtracted signal and multiplying said integrated signal by said phase difference compensation signal;

(e-7) subtracting the resulting value of said step (e-3) from the resulting value of said step (e-2), integrating said subtracted signal and multiplying said integrated signal by said phase difference compensation signal;

(e-8) adding the resulting value of said step (e-2) to the resulting value of said step (e-3), integrating said subtracted signal and multiplying said integrated signal by said phase difference compensation signal;

(e-9) adding the resulting value of said step (e-5) to the resulting value of said step (e-6);

(e-10) adding the resulting value of step (e-7) to the resulting value of said step (e-8); and (e-11) recovering said transmitted data by comparing the resulting value of said step (e-7) with result value of said step (e-8).

6. A CDMA demodulation method as claimed in claim 5, wherein said phase difference compensation signal used in said step (e-5) and said step (e-6) has a 90° phase difference with said phase difference compensation signal used in said step (e-7) and said step (e-8).

7. A CDMA (Code Division Multiple Access) modulation and demodulation method for modulating and demodulating a transmission signal in a CDMA communication system, including the steps of:

(a) generating a pilot signal and a transmission data signal;

(b) spreading the pilot signal and the transmission data signal, by multiplying said pilot signal by an inphase pseudo noise sequence and by multiplying said transmission data by a quadrature pseudo noise sequence, respectively;

(c) generating an inphase signal and a quadrature signal, by multiplying said spread pilot signal by an inphase walsh data sequence and by multiplying said spread transmission data by a quadrature walsh data sequence, respectively;

(d) modulating said inphase signal and said quadrature signal, by multiplying said inphase signal and said quadrature signal by carrier signals;

(e) transmitting a composite signal created by adding said modulated inphase signal to said modulated quadrature signal;

(f) receiving a signal compounded by an inphase signal and a quadrature signal;

(g) demodulating the transmitted signal;

(h) establishing and tracking synchronization of said demodulated transmitted signal;

(i) recovering a pilot signal and a phase difference compensation signal using said demodulated transmitted signal and said signal performed of synchronization establishment and tracking; and (j) recovering said transmission data using said demodulated transmitted signal, said signal established and tracked of synchronization, said recovered pilot signal and said recovered phase difference compensation signal.

8. A CDMA (Code Division Multiple Access) transmitter comprising:

means for generating a pilot signal and a data signal;

a first multiplier for spreading said pilot signal by multiplying said pilot signal by an inphase pseudo noise sequence;

a second multiplier for spreading a data signal by multiplying said data signal by a quadrature pseudo noise sequence;

a third multiplier for multiplying an input signal from said first multiplier by an inphase walsh data sequence, which generates an inphase signal;

a fourth multiplier for multiplying an input signal from said second multiplier by a quadrature walsh data sequence, which generates quadrature signal;

a modulating means for modulating said inphase signal and said quadrature signal; and a transmission means for transmitting transmission data, after generating said transmission data signal by adding said modulated inphase signal to said modulated quadrature signal.

9. A CDMA transmitter as claimed in claim 8, wherein said modulating means uses the QPSK modulation method.

10. A CDMA (Code Division Multiple Access) receiver comprising:

means for receiving a transmitted signal;

means for demodulating said transmitted signal;

a low pass filtering means for converting said transmitted signal to a baseband inphase signal and a baseband quadrature signal;

means for establishing and tracking synchronization of said baseband inphase signal and said baseband quadrature signal;

means for detecting a pilot signal and a phase difference compensation signal using said baseband inphase signal and said baseband quadrature signal; and means for receiving a data signal using said baseband inphase signal, said baseband quadrature signal, said pilot signal and said phase difference compensation signal;

wherein said means for detecting a pilot signal and a phase difference compensation signal comprises:

a first multiplier for multiplying said baseband inphase signal by said inphase pseudo noise sequence;

a second multiplier for multiplying said baseband quadrature signal by said inphase pseudo noise sequence;

a third multiplier for multiplying said baseband inphase signal by said inphase walsh data sequence;

a fourth multiplier for multiplying said baseband quadrature signal by said inphase walsh data sequence;

an integration means for integrating the resulting values from said third multiplier and said fourth multiplier, and for generating said phase difference compensation signals;

a squaring means for squaring each said phase difference compensation signal; and means for generating and outputting said pilot signal by combining the resulting values from said integration means.

11. A CDMA (Code Division Multiple Access) receiver comprising:
  means for receiving a transmitted signal;
  means for demodulating said transmitted signal;
  a low pass filtering means for converting said transmitted signal to a baseband inphase signal and a baseband quadrature signal;
  means for establishing and tracking synchronization of said baseband inphase signal and said baseband quadrature signal;
  means for detecting a pilot signal and a phase difference compensation signal using said baseband inphase signal and said baseband quadrature signal; and
  means for recovering a data signal using said baseband inphase signal, said baseband quadrature signal, said pilot signal and said phase difference compensation signal;
  wherein said means for establishing and tracking synchronization comprises:
    a first and second multipliers for multiplying said inphase signal and said quadrature signal by a pseudo noise sequence whose clock is ½ clock prior to the reference clock;
    a first and second integration means for integrating each the resulting value from said first and second multipliers;
    a first and a second squaring means for squaring each result values from said first and second integration means;
    a third and a fourth multipliers for multiplying said inphase signal and said quadrature signal by a pseudo noise sequence whose clock is ½ clock later than the reference clock;
    a third and a fourth means for integrating each resulting value from said third and said fourth multipliers;
    a third and a fourth squaring means for squaring each resulting value from said first and said second integration means;
    a first adder for adding result value from said first squaring means to the resulting value from said second squaring means;
    a second adder for adding result value from said third squaring means to the resulting value from said fourth squaring means;
    comparing means for comparing said pilot signal with threshold value;
    means for shifting state of synchronization in accordance with said comparing means; and
    means for generating a clock in response to the resulting value from said first adder, said second adder and said means for shifting.

12. A CDMA (Code Division Multiple Access) receiver comprising:
  means for receiving a transmitted signal;
  means for demodulating said transmitted signal;
  a low pass filtering means for converting said transmitted signal to a baseband inphase signal and a baseband quadrature signal;
  means for establishing and tracking synchronization of said baseband inphase signal and said baseband quadrature signal;
  means for detecting a pilot signal and a phase difference compensation signal using said baseband inphase signal and said baseband quadrature signal; and
  means for recovering a data signal using said baseband inphase signal, said baseband quadrature signal, said pilot signal and said phase difference compensation signal;
  wherein said means for detecting said signal comprises:
    a first and a second multipliers for multiplying said inphase signal by said inphase pseudo noise sequence and said inphase walsh data sequence;
    a third and a fourth multipliers for multiplying said inphase signal by said quadrature pseudo noise sequence and said quadrature walsh data sequence;
    a fifth and a sixth multipliers for multiplying said quadrature signal by said inphase pseudo noise sequence and said inphase walsh data sequence;
    a seventh and an eighth multipliers for multiplying said quadrature signal by said quadrature pseudo noise sequence and said quadrature walsh data sequence;
    a first subtractor for subtracting the resulting value from said eighth multiplier from the resulting value from said multiplier;
    a second subtractor for subtracting the resulting value from said fourth multiplier from the resulting value from sixth multiplier;
    a first adder for adding the resulting value from said eighth multiplier to the resulting value from second multiplier;
    a second adder for adding the resulting value from said fourth multiplier to the resulting value from sixth multiplier;
    a first integration means for integrating result value from said first subtractor;
    a second integration means for integrating result value from said first adder;
    a third integration means for integrating result value from said second subtractor;
    a fourth integration means for integrating result value from said second adder;
    a ninth through a twelfth multipliers for multiplying the resulting values from said first through said fourth integration means by said phase difference compensation signal;
    a third adder for adding the resulting value from said ninth multiplier to the resulting value from said twelfth multiplier;
    a fourth adder for adding the resulting value from said tenth multiplier to the resulting value from said eleventh multiplier; and
    means for recovering said transmitted data by comparing the resulting value from said fifth adder with the resulting value from said sixth adder.

13. A CDMA receiver as claimed in claim 12, wherein said phase difference compensation signal which is multiplied by said fir and said second intergration means has a 90° phase difference from said phase difference compensation signal which is multiplied by said third and said fourth intergration means.

14. A CDMA (Code Division Multiple Access) communication system comprising:
  a transmitter comprising:
    means for generating a pilot signal and a data signal;
    a first multiplier for spreading said pilot signal by multiplying said pilot signal by an impulse pseudo noise sequence;
    a second multiplier for spreading a data signal by multiplying said data signal by a quadrature pseudo noise sequence;
    a third multiplier for multiplying an input signal from said first multiplier by an inphase walsh data sequence which generates an inphase signal;
    a fourth multiplier for multiplying an input signal form said second multiplier by sa quadrature walsh data sequence which generatres quadrature signal;

a modulating means for modulating said inpahse signal and said quadrature signal; and a transmission means for transmitting transmission data after generating said transmission data signal by adding said modulated inphase signal to said modulated quadrature signal; and a receiver comprising:

means for receiving a transmitted signal;

means for demodulating said transmitted signal;

a low pass filtering means for converting said transmitted signal to a basehand inphase signal and a basehand quadrature signal;

means for establishing and tracking synchrization of said basehand inphase signal and said basehand quadrature signal;

means for detecting a pilot signal and a phase difference compensation signal using said basehand quadrature signal; and means for recovering a data signal using said basehand inphase signal, said basehand quadrature signal, said pilot signal and said phase difference compensation signal.

* * * * *